US006966135B1

(12) United States Patent
McDonald

(10) Patent No.: US 6,966,135 B1
(45) Date of Patent: Nov. 22, 2005

(54) POP-UP GREETING CARD PRESENTING A MEDIA ITEM

(76) Inventor: James M. McDonald, 2219 W. Olive Ave., #207, Burbank, CA (US) 91506-2648

( * ) Notice: Subject to any disclaimer, the term of this patent is extended or adjusted under 35 U.S.C. 154(b) by 0 days.

(21) Appl. No.: 10/988,686

(22) Filed: Nov. 16, 2004

(51) Int. Cl.$^7$ .................... B65D 85/57; G09F 1/06
(52) U.S. Cl. ............. 40/124.08; 40/539; 40/124.19; 206/232; 206/308.1
(58) Field of Search ................ 40/124.01, 124.06, 40/124.08, 124.14, 124.19; 206/308.1, 309–313; 446/148

(56) References Cited

U.S. PATENT DOCUMENTS

| | | | |
|---|---|---|---|
| 930,108 A * | 8/1909 | Walcutt ................... 446/148 |
| 1,541,002 A | 6/1925 | Shramek |
| 3,430,761 A | 3/1969 | Pelkey |
| 4,826,211 A | 5/1989 | Sinnott et al. |
| 5,317,823 A | 6/1994 | Brunt, II |
| 5,387,108 A | 2/1995 | Crowell |
| 5,416,993 A | 5/1995 | Shields |
| 5,450,680 A | 9/1995 | Bromberg |
| 5,613,612 A | 3/1997 | Davault |
| 5,732,491 A | 3/1998 | Burtch |
| 5,738,221 A | 4/1998 | Van Witt et al. |
| 5,746,689 A | 5/1998 | Murphy |
| 5,761,836 A | 6/1998 | Dawson |
| 5,884,770 A * | 3/1999 | Galm ...................... 206/575 |
| 5,933,989 A * | 8/1999 | Volkert et al. ........... 40/124.08 |
| 5,947,281 A * | 9/1999 | Kaneff ....................... 206/313 |
| 5,954,194 A | 9/1999 | Simpson |
| 5,971,157 A | 10/1999 | Howell et al. |
| 6,059,101 A * | 5/2000 | Gambardella et al. ... 206/308.1 |
| 6,106,023 A | 8/2000 | Sud et al. |
| 6,267,233 B1 | 7/2001 | Stern et al. |
| 6,279,739 B1 | 8/2001 | Moore et al. |
| 6,311,142 B1 | 10/2001 | Glassner |
| 6,453,800 B1 | 8/2002 | Simpson |
| 6,505,737 B1 * | 1/2003 | Sherman ................ 206/308.1 |
| 6,640,473 B1 | 11/2003 | Shenk |
| 6,643,962 B1 | 11/2003 | Panec et al. |
| 6,877,263 B2 * | 4/2005 | Clark ..................... 40/124.06 |
| 2003/0230515 A1 | 12/2003 | Mouyal |

* cited by examiner

Primary Examiner—Cassandra Davis
(74) Attorney, Agent, or Firm—William L. MacBride, Jr.

(57) ABSTRACT

A pop-up greeting card presenting a media item to a recipient, comprising two card panels integrally formed with a pop-up element secured between the card panels, forming a three-dimensional configuration with an elongated slot through which the free end of a presentation support element periscopes when the pop-up greeting card is opened. A media item, such as a CD or mini CD, is inserted in the presentation support element such that the media item protrudes at least partially through the elongated pop-up slot when the front surfaces of the card panels are brought together, and is extended through the pop-up slot by the presentation support element when the recipient opens the greeting card. The media item is presented to a recipient of the pop-up greeting card when the card panels are moved apart, as the greeting card is opened.

8 Claims, 6 Drawing Sheets

POP-UP GREETING CARD PRESENTING A MEDIA ITEM

BACKGROUND OF THE INVENTION

The present invention relates to the field of pop-up greeting cards. More particularly, the invention is directed to pop-up greeting, gift and novelty cards, pre-assembled to present a sound media item, such as a compact disk (CD) when the greeting card is opened by a recipient.

Pop-up greeting, gift and novelty cards (collectively, "greeting cards") have traditionally been given or exchanged on anniversaries, birthdays, graduations, holidays and other personal or holiday occasions or in friendship; to send gifts, messages, pictures, poems or songs, and to celebrate or commemorate such special events or relationships. While some such greeting cards have contained a CD, digital video disc (DVD), picture or other small gift item loosely attached or contained within and removable from the card when it is opened, none of these existing greeting cards present the gift item in a pop-up presentation feature for the recipient upon opening the greeting card.

Pop-up greeting cards are well-known in the related art, in a variety of designs. Pop-up cards commonly include text, drawings, and pictures on the card itself, as well as pop-up figures. Greeting cards also may contain sound devices embedded in the cards, such as computer or electronic chips that play a greeting, short tune or song, or personalized message or song, when the card is opened. However, pop-up greeting cards have not provided a pre-assembled gift package whereby the pop-up feature of the card automatically presents a CD, DVD or other such media item gift integrally connected to the pop-up element when the card is opened by the recipient.

Devices with pop-up elements have been provided with subsequent removal of CDs, but in only the form of packaging as self mailers or for display purposes in connection with use in CD jewel boxes. None of these self mailers or displays provide for the element of a greeting card.

To date, devices containing CDs, DVDs and other sound media items, generally, have fallen into three categories: (I) self-mailers and packaging to protect the media item; (ii) pop-up displays whereby a media item subsequently by manual action can be permanently displayed by the recipient or as a point-of-purchase display or (iii) greeting cards in which the media item is actually embedded or otherwise attached in the card to deliver the item or play a message upon the opening of the card.

The present invention is a gift package whereby the pop-up feature of the card automatically and immediately presents a CD, DVD or other such media item gift to the receiver when the card is opened. Accordingly, it is an object for the present invention to provide the recipient of a pop-up greeting card a novel experience upon opening the greeting card, the presentation of the media item such as a CD integrally and removably attached, or pre-assembled, to the pop-up element of the greeting card.

Accordingly, it is an object of the present invention to provide an improved greeting card, presenting the media item, such as the CD, to the recipient of the greeting card upon his opening the card.

Related art provides information regarding greeting cards containing CDs, as examples: U.S. Pat. No. 6,640,473 to Shenk and U.S. Pat. No. 6,106,023 to Sud, et al. While providing for greeting cards containing a CD, neither of these patents provide the feature of a pop-up card element found in the present invention. As well, the CD gift, or other media item, included in each of these greeting cards must be manually manipulated in the respective inventions to provide for a presentation of the CD gift upon the recipient opening the respective greeting card. The patent to Sud includes a formed, raised image and panels, and the CD in Shenk is secured to a panel of the greeting card, each precluding a pop-up element from being utilized. None of these patents provide the feature of a pop-up card element found in the present invention. Therefore, an object of the present invention, novel experience, is lost in these patented inventions.

Other related art regards devices that provide information about sound media items playing tunes or messages, as examples: U.S. Pat. No. 5,387,108 to Crowell, U.S. Pat. No. 3,430,761 to Pelkey, U.S. Pat. No. 5,761,836 to Dawson and U.S. Pat. No. 1,541,002 to Shramek. However, none of these patents provide the feature of presenting a CD to the recipient, an element of the present invention. The patents to Crowell and Dawson provide audible message switches as a function of the devices, not part of the present invention. Crowell is not a greeting card. None of these patents provide the feature of a pop-up card element found in the present invention.

The related art patents to Crowell, Pelkey, Shramek, U.S. Pat. No. 6,453,300 B2 to Simpson and U.S. Pat. No. 5,954,194 to Simpson function as display devices for media items or as self-mailers requiring mailing elements, in each case inhibiting the automatic or spontaneous feature found in the present invention, when the device is opened or received by the recipient, requiring the recipient to physically manipulate the media item to extract it from its location in each device, thereby prohibiting the pre-assembled pop-up and automatic presentation feature found in the present invention. The related art patents to Simpson '300 and Simpson '194 function as display devices for CDs, requiring the recipient to physically manipulate the CD to extract it from its location in each device, by either sliding the CD, or other media item from a sleeve, pulling the CD off an adhesive backing or pulling the item from its casing, thereby prohibiting the pre-assembled pop-up and automatic presentation feature found in the present invention. The Pelkey and Schramek devices relates solely to phonograph records as an element of each, lacking the pop-up presentation element. Schramek is a postcard and not a greeting card.

Other related art provides information regarding pop-up display devices, displaying CDs, as examples: U.S. Pat. No. 5,613,612 to Davault, U.S. Pat. No. 5,738,221 to Van Witt, et al., U.S. Pat. No. 6,279,739 to Moore, U.S. Patent 2003/0230515 to Mouyal, U.S. Pat. No. 5,317,823 to Brunt II, U.S. Pat. No. 5,971,157 to Howell, et al. and U.S. Pat. No. 5,732,491 to Burtch, as well as Simpson '300 and Simpson '194, do not have the elements of a greeting card of the present invention. Davault, Van Witt, Howell, Simpson '300 and Simpson '194 require the recipient to physically manipulate the CD to extract it from its location in each device, by either sliding the CD, or other media item from the sleeve, pulling the CD off an adhesive backing or pulling the item from its casing, thereby prohibiting the pre-assembled pop-up and automatic presentation feature found in the present invention. Moore and Mouyal are self-mailers. Brunt II does not include the CD element. Burch is solely a display device. None of these patented inventions provide the greeting card element of the present invention. Therefore, the objects of the present invention, novel experience and improved greeting cards are lost with these patented inventions.

As well, the patents to Davault, Van Witt, Mouyal and Howell do not provide an element pop-up feature element of the present invention, providing spontaneous presentation of a CD to the recipient when a greeting card is opened. No greeting card element is provided by these patents. The CD in each of these patented inventions must be manually manipulated in the respective inventions to provide for a presentation after the recipient opens the respective display device or CD jewel box. The patent to Brunt II does not provide for the element of display of a CD. The patents to Moore and Burtch provide for the pop-up feature but are constructed either in a manner to function as a self-mailer device (in Moore) or to provide the function exclusively for display (Moore and Burtch), to preclude, in either case, their function as greeting cards. The patents to Davault, Van Witt, Simpson '300 and Simpson '194 provide devices for use in jewel boxes containing the CDs, completely preventing their use as greeting cards. A U.S. Pat. No. 6,267,233 to Stern, et al., while a display containing a CD, does not provide the features of a pop-up greeting card elements found in the present invention.

Although these related art patented inventions provide features for packing, shipping or displaying CDs or other recorded music or messages, none provide the combination of the greeting card and the disk/pop-up elements of the present invention. All of the related art patented inventions cited above suffer from one or more of the following disadvantages:

1. Serving only as self-mailer and packaging device for shipping and display purposes;
2. Requiring it to be opened in its entirety to remove the sound recording device; or
3. Not serving as a gift package that presents a recording device to the recipient as part of and integrated into the three-dimensional pop-up design and greeting.

Accordingly, besides the objects and advantages of the present invention described above, several additional objects and advantages of the present invention are, as follows:

(A) To provide a greeting card as a gift package that spontaneously presents a CD or DVD (playing a greeting, short tune, song or poem, or personalized message, poem or song, or containing a personal audiovisual message);
(B) To provide a greeting card that is a pop-up greeting containing a CD or other media item;
(C) To provide a greeting card that spontaneously presents a CD or other media item, pre-assembled by being removably secured in the greeting card, when the card is opened by the recipient; and
(D) To provide a pop-up greeting card in which the CD or other media item is integrated into the pop-up element to surprise the recipient.

Still further objects and advantages of the present invention will become apparent from a consideration of the ensuing descriptions and drawings.

SUMMARY OF THE INVENTION

In accordance with the present invention, a pop-up greeting card presenting a CD or other media item to a recipient comprises a first card panel and a second card panel integrally formed with and hingedly connected to a common hinge line to the first card panel. The first card panel and the second card panel of the greeting card may be substantially equal in dimension.

A pop-up element is secured between each of the two card panels, capable of folding together when said first and second card panels are brought together by a recipient of the pop-up greeting card. The pop-up element forms a three-dimensional configuration when the two card panels are moved apart. The pop-up element is formed from a unitary blank (including a presentation support element), consisting of a series of five (5) rectangular pop-up panels. The pop-up element has a top surface and a front surface integrally formed with and hingedly connected to a common fold line to the top surface.

The presentation support element has a first end and a second end, the first end located centrally along and parallel to the common hinge line and the second end free, and has an elongated pocket slot positioned centrally along the length of the presentation support element and parallel to the common hinge line. The pop-up element has an elongated pop-up slot positioned centrally on the top surface and parallel to said common hinge line, through which said free end of the presentation support element periscopes when the front surfaces of the two panels are moved apart by a recipient of the pop-up greeting card.

A media item is removably inserted in the pocket slot such that the media item protrudes at least partially through said elongated pop-up slot when the first and second panels are brought together. The media item may be a number of different of sound recording items, including a compact disc, a miniature compact disc, a miniature digital disc and a miniature or regular video disc, among others.

The first and second panels of the pop-up greeting card fold together for packaging the media item within the card when the first and second panels are brought together. The free end of the presentation support element extends the media item through the pop-up slot as the free end of the presentation support element periscopes through the pop-up slot when the front surfaces of the two panels are moved apart as the recipient opens the greeting card. As with any greeting card received for a special occasion, the recipient is anxiously opening the card, and in the present invention will receive a novel surprise; a media item is presented to a recipient of the pop-up greeting card when the front surfaces of said two panels are moved apart, as the card is opened.

The elements of the greeting card set forth above provide a method of presenting a media item to a recipient of a greeting card. Accordingly, it is an object for the present invention to provide a pop-up greeting card as a gift package containing a media item, such as a CD, or other sound media or other planar item, whereby the pop-up feature of the card presents such media item when the card is opened. An embodiment of the present invention relates more specifically to a pop-up greeting card gift package that presents a miniature (mini) CD with a personalized song.

Other and further objects and advantages of the present invention will appear hereinafter.

BRIEF DESCRIPTION OF THE DRAWINGS

Other objects and features will become apparent from the following detailed description taken in combination with the accompanying drawings. However, the drawings are provided for purpose of illustration only, and are not intended as a definition of the limits of the invention.

Similar reference characters denote corresponding features consistently throughout the accompanying drawings.

DETAILED DESCRIPTION OF THE INVENTION

The present invention will now be described more fully hereinafter with reference to the accompanying drawings, in which the preferred embodiment of the invention is shown. This invention may, however, be embodied in different forms and should not be construed as limited to the embodiment set forth herein. Rather, the illustrative embodiment is provided so that this disclosure will be thorough and complete, and will full convey the scope of the invention to those skilled in the art. Like numbers refer to like elements throughout.

Figure 1:
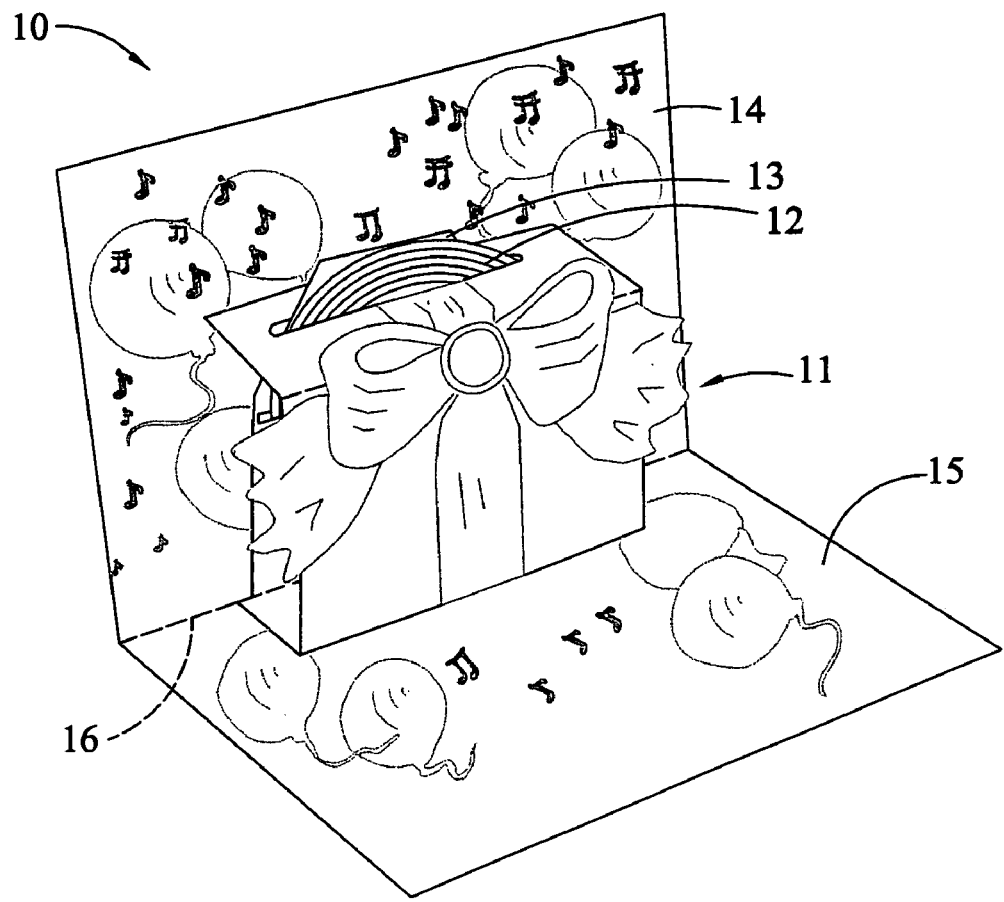
FIG. 1 is a perspective view of the greeting card in accordance with the present invention.

Turning now in detail to the drawings as shown in FIGS. 1–7, a preferred embodiment of the present invention is shown in FIG. 1, a perspective view of the pop-up greeting card 10 with a pop-up element 11 automatically or spontaneously presenting a media item, for example a CD 12 as depicted when the greeting card 10 is opened, shown thereby by use of an elongate presentation support element 13. All of the parts of the pop-up greeting card 10 as shown in FIG. 1 are preferably made from thick paper stock well known in the art; however, plastic or other materials may also be used.

Figure 2:
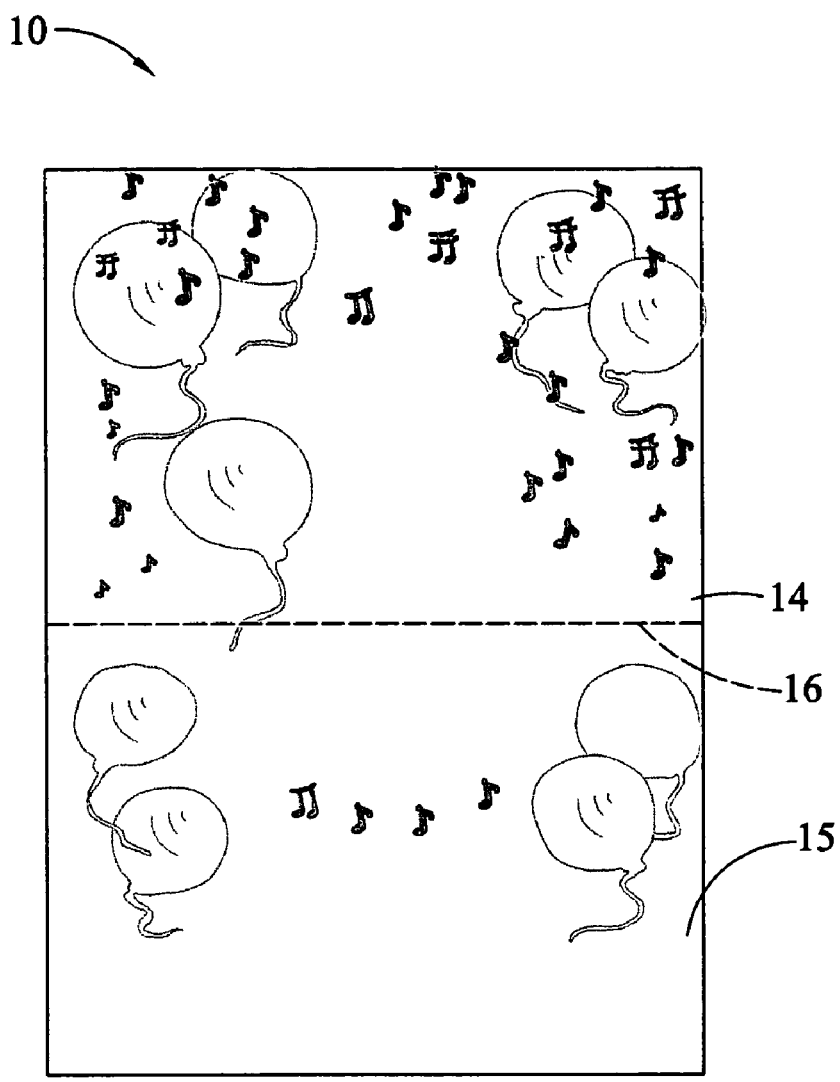
FIG. 2 is a perspective view of the first and second card panels of the pop-up greeting card in accordance with the present invention.

FIG. 2 is a perspective view of the pop-up greeting card 10 in accordance with the present invention, comprising a first card panel 14 and a second card panel 15 integrally formed with and hingedly connected to a common hinge line 16 to the first card panel 14. In the preferred embodiment the card panels are square or rectangular. In alternative embodiments the card panels (14 and 15, respectively) may be of the same overall shape and size. In alternative embodiments the first card panel 14 and the second card panel 15 of the pop-up greeting card 10 may be substantially equal in dimension or of differing dimensions. FIG. 1 depicts the same references in the perspective view thereto.

Figure 3:
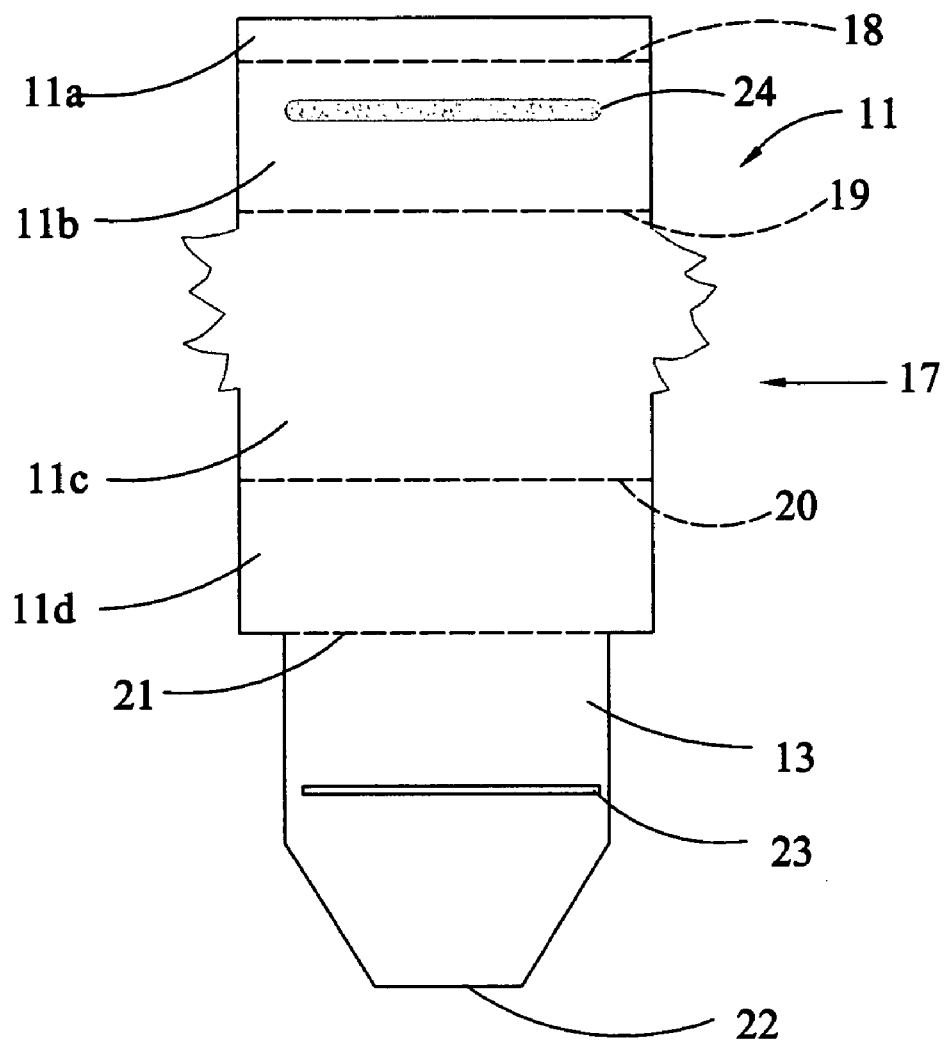
FIG. 3 is a plan view of the unitary blank of the pop-up element and the presentation support element in accordance with the present invention.

FIG. 3 is a plan view of the pop-up element 11, formed from a unitary blank 17, including the presentation support element 13. FIG. 3 illustrates that the unitary blank 17 consists of a series of five (5) rectangular pop-up panels: 11a, 11b, 11c and 11d (that together integrally form the pop-up element 11), and the panel constituting the presentation support element 13. These five (5) serially arranged pop-up panels (11a, 11b, 11c, 11d, and the presentation support element 13, respectively) are defined or created by folding the unitary blank 17 along four (4) respective fold lines: 18, 19 and 20, and the common hinge line 16, as depicted by the plan view of FIG. 3, creating common hingedly connected folds or hinges, with the respective pop-up panels, in accordance with the present invention.

The presentation support element 13, shown in FIG. 3, is more narrow in width than the remainder of the unitary blank 17, and has a first end 21 and a tapered second end 22. The first end 21 is located centrally along and integrally formed with and hingedly connected to the common hinge line 16 with pop-up panel 11d, and the second end 22 is unsecured and remains free. The presentation support element 13 has an elongated pocket slot 23, preferably smaller as compared to the diameter or dimension of the media item 12, a CD or other media item, and positioned centrally along the length of the presentation support element 13 and parallel to the common hinge line 16. The pop-up element 11 has an elongated pop-up slot 24, preferably larger as compared to the width or dimension of the second end 22 of the presentation support element 13, and positioned centrally within the pop-up element 11 in pop-up panel 11b and parallel to the common hinge lines 16 and fold lines 18 and 19.

Figure 4:
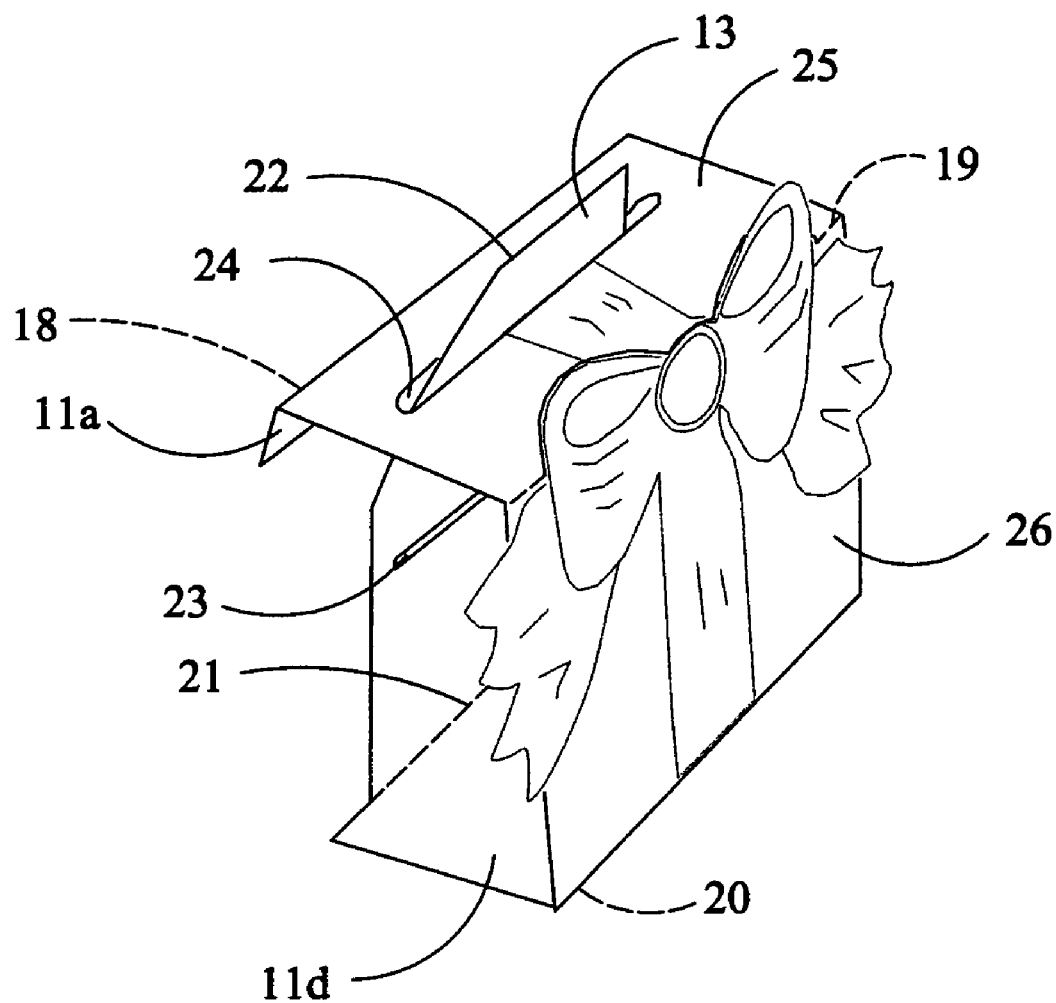
FIG. 4 is a perspective view of the top and side surfaces of the pop-up element and the presentation support element in accordance with the present invention.

FIG. 4 is a perspective view of the pop-up element 11 employing the presentation support element 13 in accordance with the present invention in its three-dimensional configuration. The pop-up element 11 has a top surface 25 (formed by pop-up panel 11b) and a front surface 26 (formed by pop-up panel 11c) integrally formed with and hingedly connected to fold line 19 to the top surface 25. Said top and front surfaces (25 and 26, respectively) are hingedly connected along respective fold lines 18 and 20 to pop-up panels 11a and 11d respectively.

Figure 5:
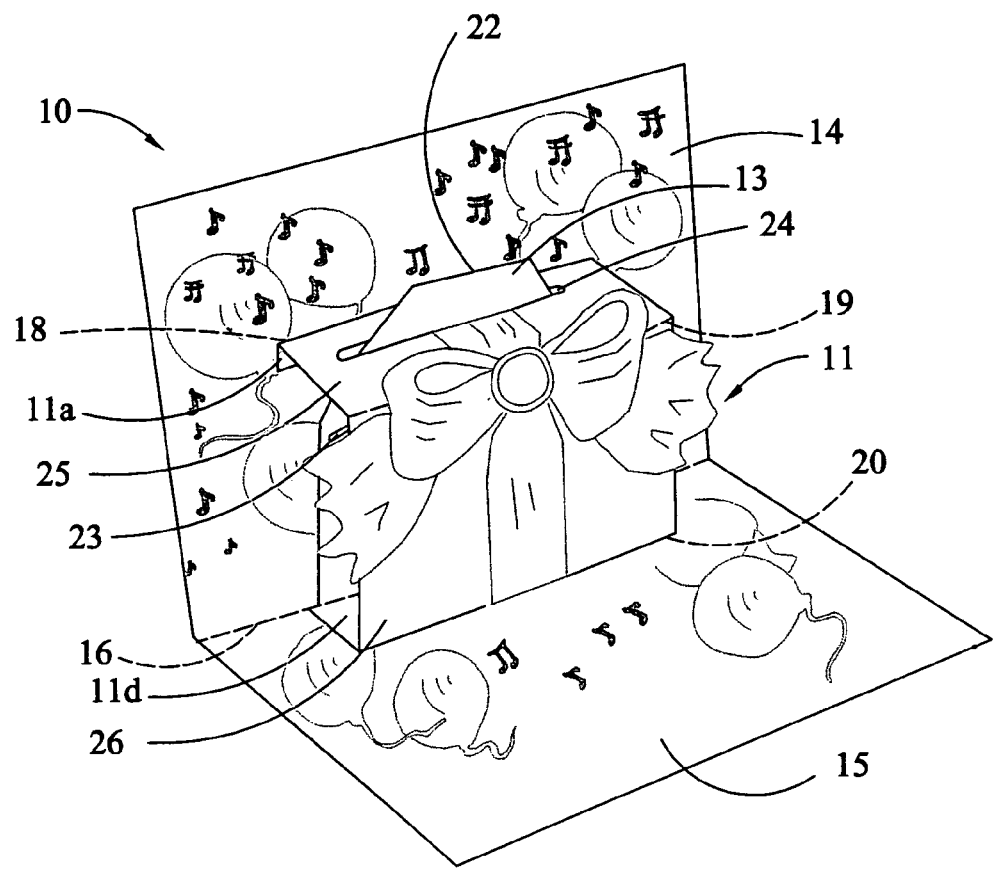
FIG. 5 is a perspective view of the greeting card showing the pop-up element and the presentation support element in accordance with the present invention.

FIG. 5 is a perspective view of the greeting card 10 showing the presentation support element 13 in accordance with the present invention. The pop-up element 11 has an elongated pop-up slot 24, also depicted in FIGS. 3 and 4, positioned centrally on the top surface 25 and parallel to fold lines 18 and 19, through which pop-up slot 24 the free end 22 of the presentation support element 13 at least partially protrudes and periscopes further through when the first and second card panels (14 and 15, respectively) are moved apart by a recipient opening up the pop-up greeting card 10, as further depicted in FIG. 6, below.

Pop-up panels 11a and 11d of the unitary blank 17, hingedly connected along respective fold lines 18 and 20 to the top side 25 and the front side 26 respectively of pop-up element 11, are adjoined or sealed to the respective first and second card panels 14 and 15, by the use of an adhesive, such as glue or other adhesive commonly known and used in the art, or by tape or other suitable sealing means. The pop-up element 11, thereby, is secured between and sealed to the first card panel 14 and second card panel 15 of the pop-up greeting card 10. The pop-up element 11 is centered along common hinge line 16 hingedly connecting first card panel 14 and second card panel 15 of the greeting card 10, said common hinge line 16 in common with pop-up element 11.

As demonstrated by FIGS. 1 and 5, media item 12, the CD or other media item, is removably inserted and secured in the pocket slot 24 such that the media item 12, along with the presentation support element 13 protrude at least partially through said elongated pop-up slot 24.

Figure 6:
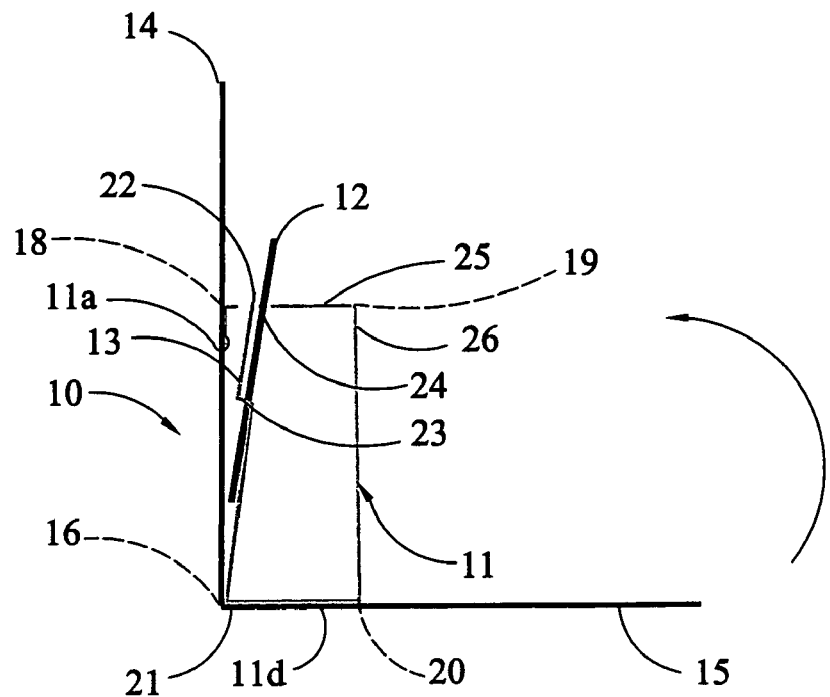
FIG. 6 is a side view of the first and second card panels, of the top and side surfaces of the pop-up element and of the presentation support element presenting the media item to the open greeting card in accordance with the present invention.
Figure 7:
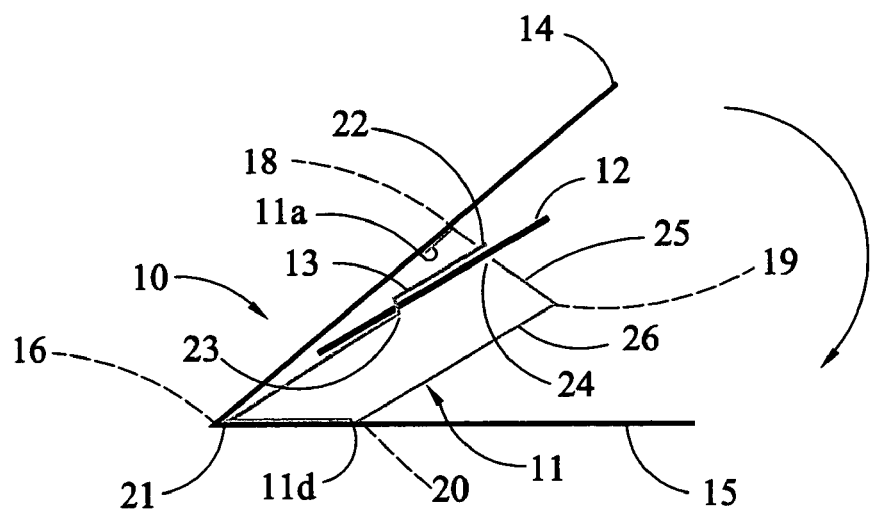
FIG. 7 is a side view of the first and second card panels, of the top and side surfaces of the pop-up element, of the presentation support element and of the media item to the greeting card partially open in accordance with the present invention.

FIGS. 6 and 7 are side views of the first card and second card panels (14 and 15, respectively) of the pop-up greeting card 10, including the top surface 25 and side surface 26 of the pop-up element 11 and the presentation support element 13 containing the media item 12, to the pop-up greeting card 10 in accordance with the present invention. The second end 22 of the presentation support element 13 extends the media item 12 through the pop-up slot 24 as the second end 22 of the presentation support element 13 periscopes through the pop-up slot 24 when the first and second card panels (14 and 15, respectively) are moved apart when the recipient opens the pop-up greeting card 10, as depicted above in FIG. 6.

As depicted in FIG. 7, the first and second card panels of the pop-up greeting card (14 and 15, respectively) fold together for packaging the media item 12 within the pop-up greeting card 10 when the first and second card panels (14 and 15, respectively) are brought together, when the pop-up greeting card 10 is closed. The media item 12, the CD or other media item, is protected from scratching or other damage prior to receipt by the recipient when said card panels (14 and 15, respectively) of greeting card 10 are closed.

As with any greeting card received for a special occasion, the recipient is anxiously opening the pop-up greeting card 10, and in the present invention will receive a novel surprise; the media item 12 is automatically or spontaneously presented to the recipient of the pop-up greeting card 10 when the first and second card panels (14 and 15, respectively) are moved apart, as the greeting card 10 is opened.

In alternative embodiments of the present invention, the media item 12 may be substituted by a number of different sound recording items in addition to the CD, commonly known, including a miniature compact disc, a miniature digital disc, a video disc and a miniature video disc, among others.

The elements of the pop-up greeting card 10 shown and described above provide a method of presenting the media item 12, such as the CD or other item, to a recipient of a pop-up greeting card 10. Accordingly, it is an object for the present invention to provide the pop-up greeting card 10 as a gift package containing the media item 12, such as a CD or other sound media item or other planar item, whereby the pop-up feature of the card presents such media item 12, or other item, when the pop-up greeting card 10 is opened. An alternative embodiment of the present invention relates more specifically to a pop-up greeting card gift package that presents a miniature (mini) CD with a personalized song. Various changes can, of course, be made to the preferred embodiment of the present invention without departing from the spirit and scope of the present invention. The present invention, therefore, should not be restricted, except to the following claims and their equivalents.

I claim:

1. A pop-up greeting card, comprising:
   (a) a first card panel;
   (b) a second card panel integrally formed with and hingedly connected by a common hinge line to said first card panel;
   (c) a pop-up element secured between each of said first and second card panels;
   (d) means for securing said pop-up element to said first card panel and said second card panel respectively;
   (e) said pop-up element including serially arranged panels defined by respective fold lines;
   (f) said pop-up element having a top surface and a front surface integrally formed with and hingedly connected by a common fold line to the top surface;
   (g) said pop-up element integrally adjoined with said first and second card panels so that a three-dimensional configuration of the pop-up greeting card is formed when said first and second card panels are moved apart and said pop-up element is capable of folding together when said first and second card panels are brought together;
   (h) said pop-up element having a presentation support element with a first end and a second end, the first end integrally formed with and hingedly connected centrally along said common hinge line to the pop-up element and the second end free;
   (i) said presentation support element having an elongated pocket slot being positioned centrally along the length of said presentation support element and parallel to said common hinge line;
   j) said pop-up element having an elongated pop-up slot being positioned centrally on said top surface and parallel to said common hinge line, through which said second end of the presentation support element periscopes when said first and second card panels are moved apart;
   (k) at least one media item being removably inserted in said pocket slot such that the media item protrudes at least partially through said elongated pop-up slot when said first and second card panels are brought together;
   (l) said first and second card panels packaging the at least one media item within the pop-up greeting card when said first and second card panels are brought together,
   (m) said free end of the presentation support element extending the at least one media item through the pop-up slot as the fee end of the presentation support element periscopes through the pop-up slot when said first and second card panels are moved apart; and
   (n) whereby the at least one media item is presented to a recipient of the pop-up greeting card when said first and second card panels are moved apart.

2. The pop-up greeting card of claim 1 wherein the at least one media item is a recording item selected from the group consisting of a compact disc, a miniature compact disc, a miniature digital disc, a video disc and a miniature video disc.

3. The pop-up greeting card of claim 1 wherein the first card panel and the second card panel are substantially equal in dimension.

4. The pop-up greeting card of claim 1 wherein the first card panel and the second card panel are of differing dimensions.

5. A method of presenting a media item to a recipient of a pop-up greeting card, comprising:
   (a) providing a greeting card of the type comprising a first card panel and a second card panel integrally formed with and hingedly connected by a common hinge line to said first card panel;
   (b) providing a pop-up element comprising serially arranged panels defined by respective fold lines secured by a securing means to said first card panel and said second card panel respectively and capable of folding together when said first and second card panels are brought together, and forming a three-dimensional configuration when said first and second panels are moved apart, said pop-up element having a top surface and a front surface integrally formed with and hingedly connected by a common fold line to the top surface,
   (c) providing a presentation support element having a first end and a second end, the first end integrally formed with and hingedly connected centrally along said common hinge line to the pop-up element and the second end free;

(d) positioning an elongated pocket slot centrally along the length of the presentation support element and parallel to said common hinge line;

(e) positioning an elongated pop-up slot centrally on said top surface of the pop-up element and parallel to said common hinge line, through which said second end of the presentation support element periscopes when said first and second card panels are moved apart;

(f) removably inserting at least one media item in said pocket slot such that the at least one media item protrudes at least partially through said elongated pop-up slot when said first and second panels are brought together;

(g) folding said first and second card panels together packaging the at least one media item within the pop-up greeting card when said first and second card panels are brought together, (h) extending the at least one media item through the pop-up slot as the free end of the presentation support element periscopes through the pop-up slot when said first and second card panels are moved apart; and (i) whereby the at least one media item is presented to a recipient of the pop-up greeting card when said front surfaces of said first and second card panels are moved apart.

6. The method of claim 5 wherein the at least one media item is a recording item selected from the group consisting of a compact disc, a miniature compact disc, a miniature digital disc, a video disc and a miniature video disc.

7. The method of claim 5 wherein the first card panel and the second card panel are substantially equal in dimension.

8. The method of claim 5 wherein the first card panel and the second card panel are of differing dimensions.

* * * * *